Nov. 13, 1951 L. SCHARFE 2,574,593
DENTAL FLASK
Filed Dec. 30, 1949 2 SHEETS—SHEET 1

INVENTOR.
LEO SCHARFE.
BY Howard J. Whelan,
ATTORNEY.

Nov. 13, 1951 L. SCHARFE 2,574,593
DENTAL FLASK
Filed Dec. 30, 1949 2 SHEETS—SHEET 2
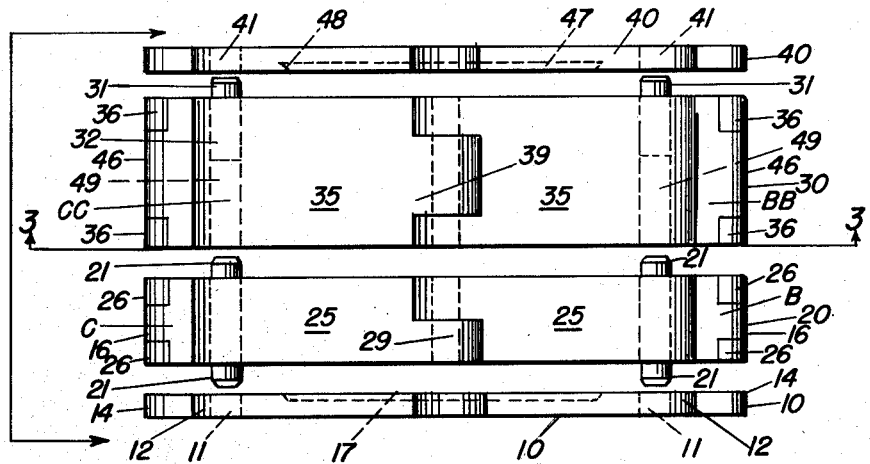
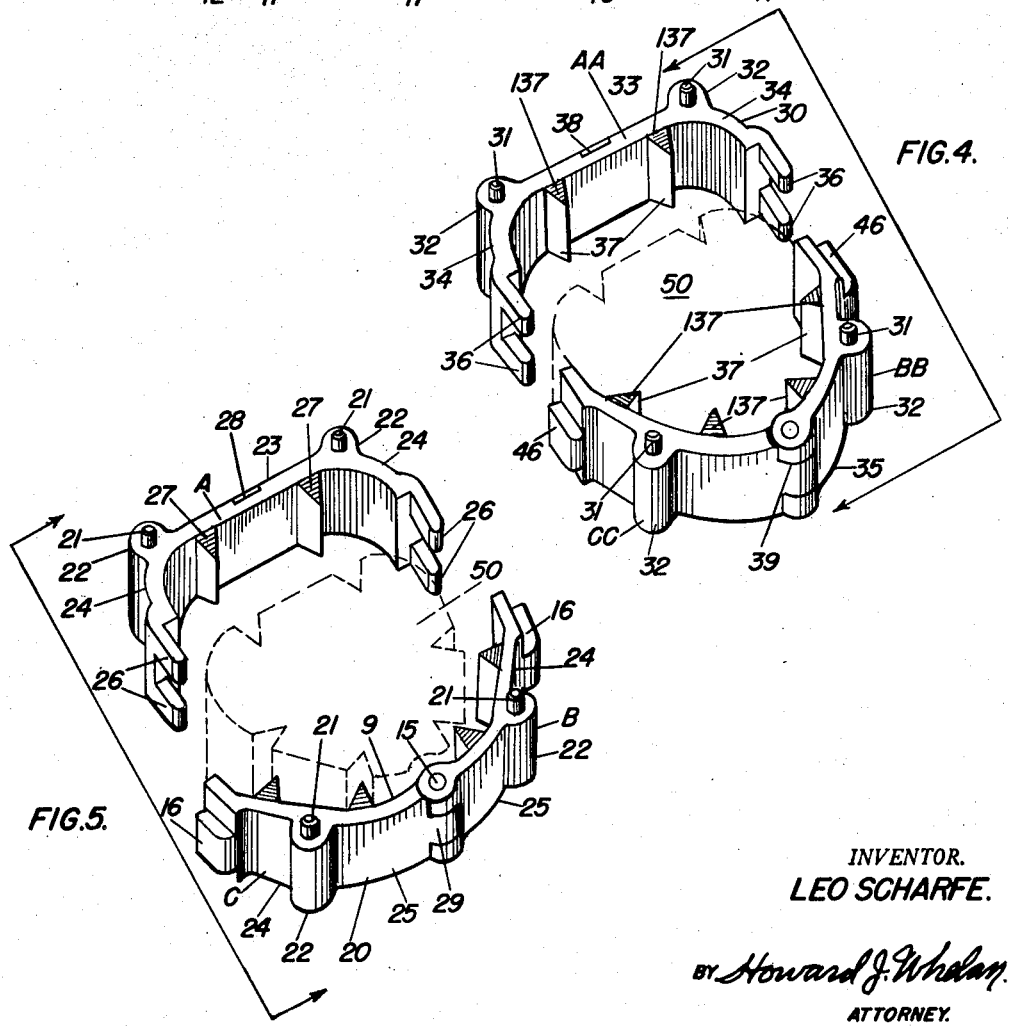
INVENTOR.
LEO SCHARFE.
BY Howard J. Whelan
ATTORNEY.

Patented Nov. 13, 1951

2,574,593

UNITED STATES PATENT OFFICE 2,574,593

DENTAL FLASK

Leo Scharfe, Baltimore, Md.

Application December 30, 1949, Serial No. 136,129

2 Claims. (Cl. 18—33)

This invention relates to dental equipment and more particularly to devices for the processes involved in oral plate construction. In a general way such devices are termed flasks.

It is an improvement of the structure mentioned in application Serial Number 125,047, filed in the United States Patent Office, November 2, 1949, to which reference is made for a description of the use and purposes of the device. However this particular invention includes a construction that facilitates the making of the dental plates and greatly expedites their completion and removal from the plaster cast while at the same time lessening the chances of breakage and spoilage.

It is therefore an object of this invention to provide a new and improved flask unit for dental plate making that will avoid one or more of the disadvantages and limitations of the prior art.

Another object of the invention is to provide a new and improved flask unit for dental plate manufacture that will permit the handling of the molds made therein to be done readily and provide for such manipulation as may be desirable, either in the hand or machine, to be accomplished quickly and conveniently.

A further object of the present invention is to provide a new and improved dental flask unit that will enable various portions of the molds and their incidental contents to be segregated and worked on individually yet returnable to the unit in their original places and positions.

A further object of the invention herein described is to provide a new and improved molding flask for the production of dental plates that will enable the articles made therein to be removed from the molding material without the use of saws as is done with conventional methods.

A still further object of this invention is to provide a flask which will create indentations in the molding material so the same may be parted from the dental plates.

Other objects will be evident as the invention is more fully described.

In the drawings is illustrated a particular form of the invention by way of example, not of limitation. These drawings are outlined in the following description, while the claims emphasize the scope thereof.

In the drawings:

Figure 2 is an exploded side view of the flask shown in Figure 1;

Figure 4 is a perspective exploded view of a section with the sector "A" removed from the cast material;

Figure 5 is a perspective exploded view of the three sectors removed from the cast material;

Similar reference numerals pertain to the same parts throughout the figures.

Figure 1:
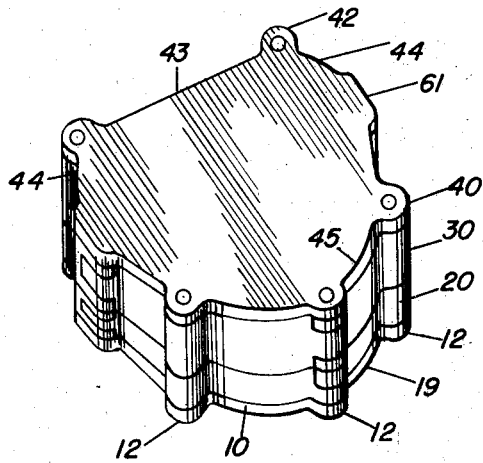
Figure 1 is a view in perspective showing the flask embodying this invention.
Figures 6, 7:
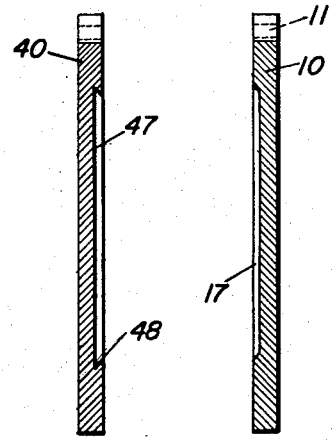
Figure 6 is a typical lateral sectional view taken through the base.
Figure 7 is a typical lateral sectional view taken through the cover.
Figure 3:
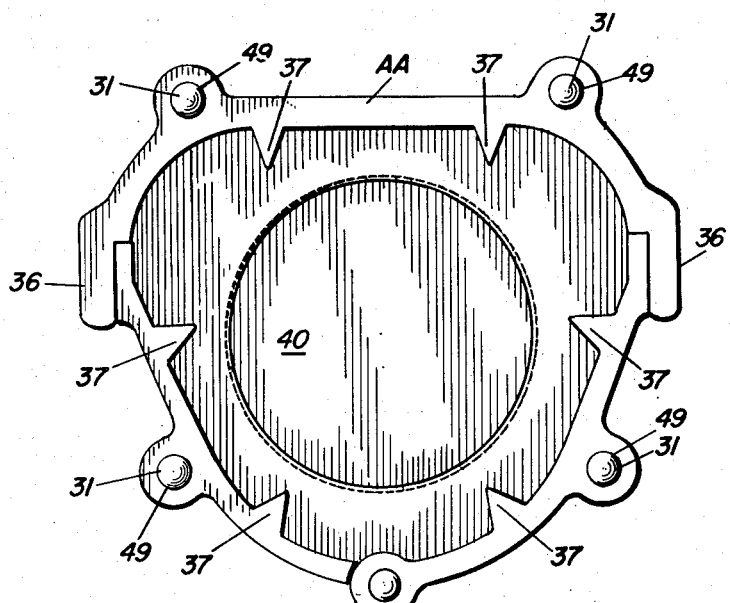
Figure 3 is a plan view looking in the directions of arrows 3—3 of Figure 2.

The drawings indicate a flask unit employable for making and processing dental plates. The unit includes four particular sections; a base 10, a lower frame 20, an upper frame 30 and a cover plate 40. The sections are provided with dowels insertable in passages when aligned with each other to hold them together so they will not be displaced. The base 10 is preferably arranged with the passages or holes 11 as indicated in four locations arranged in projecting ears 12, spaced apart at predetermined distances about the periphery of the base. The base 10 is relatively flat but of sufficient thickness to withstand the stresses and uses to which it is put. In the middle portion thereof, an interior recess 17 of circular form and of shallow depth is formed to provide a vacuum space for holding the casting that is set therein. The peripheral contour of the base is preferably as indicated in the drawings. Thus one side 13 is straight and terminates with two of the ears 12 and passages 11 therein. The periphery rises or extends at an angle therefrom to form two symmetrical sides 14 with intermediate projectional lugs 12 included. The remaining side 19 is arcuate and includes two more of the ears 12 and passages 11.

The lower section 20 is mounted on the base and conforms in general periphery with the peripheral border of the base 10. Its similar sides or walls or noted at 23, 24 and 25 respectively and dowels 21, align with and are inserted in the holes or passages 11. The placement of the dowels 21 therein secures the lower section to the base 10 and both are held securely together against lateral displacement. The section 20 has its walls of medium height, such as about 5/8" for ordinary purposes. It is divided into three sectors A, B and C. One of these, "A," is made up of the walls 23 and 24 in a solid or integral place terminated in bifurcated junctions or jaws 26. These junctions align with the lugs 16 and are of the same general peripheral contour. The interior surface of the sector A, has a pair of inverted V-like ribs 27 vertically arranged thereon. The purpose of these ribs is to produce a V-like groove in the plaster or molding material used in the section to assist in its drying and so it may be broken out easily when the teeth are about to be removed. The dowels 21 in this sector project above and below its face and bottom, as indicated. The lower or bottom ones go into the base holes 11, while the face ones insert in the upper section 30 as hereinafter disclosed. A bevelled recess 28 is provided at the face and bottom to allow the insertion of a tool at the joints between the sections for prying them apart. The sectors B and C are symmetrical in general and joined together by a pin 15 to form a hinged mechanism 29 that enables them to swing out therefrom like jaws. They have ears 22 from which the dowels 21 project to join in the holes 31 in the ears 32 in the section 30. The sectors B and C also have ribs 27 of the inverted V-shape on their inside surfaces. These sectors have lugs or tongues 16 extending from their free ends and arranged to fit within the junctions 26 and hold the sectors together when they are assembled to the base 10 and registered with the lugs 16. The edge of the pin 15 is preferably aligned with the curved edge 9, so the projection surrounding the pin will not be pressed into the plaster cast and break same when the sections "B" and "C" are opened. The manner in which the connection is made is apparent from the drawings. The dowels when fastened to the adjacent sections serve to lock the sections rigidly together and to prevent them from opening up laterally. When the base 10 and the lower section 20 are so assembled, they serve together as a receptacle for the wax dental replica to be impressed by a set of artificial teeth, and the work or adjustment required can be done conveniently thereon. Later the wax is melted out in a conventional manner, and layers of molding material pressed in its place. The other section 30 and the cover plate 40 can be detached entirely from the unit while the work just described is being done.

The upper section 30 is similar in shape and contour to the lower section 20. The main distinction is in the depth of the upper section which is about double that of the lower section 20. The upper section 30 includes holes 49 and dowels 31, the ears 32, the walls 33, 34 and 35, the junctions or jaws 36, ribs 37, recesses 38, hinge mechanism 39 and the tongue 18. The top of the ribs 37 are slightly tapered at 137 to allow the hand of the user to form a concave in the plaster placed therein. The functions are similar in general to those parts corresponding to them in section 20. The sections are made of three sectors AA, BB and CC, that respectively align with sectors A, B and C. This upper section is placed on the section 20 and filled with the molding material used in connection with the matrix made in it for the dental plate or pattern placed in the lower section 20. The holes 49 receive the dowels from the face of the lower section, while the dowels 31 on the face of the upper section align and enter the holes 41 in the cover plate 40 mounted on top.

The cover plate 40 is symmetrical with the base and conforms very closely to it in structure. Its thickness is about the same. It is flat and has ears 42, sides 43, 44 and 45, and the interior surface of this plate is recessed at 47 to a slight depth in a circular manner with its edge portions 48 undercut.

The recess 47 is undercut to enable the cover plate 40 to receive and hold a "stone" cast used in connection with the work. The cast projects from the underside of this plate and requires the making of a hollow space in the top of the casting material poured into the upper section 30. This space is usually ejected after the molding material has partly set. The plate 40 is mounted on the upper section 30 by registering its holes 41 with the dowels 31. Material is poured into the dug out space (after latter is greased to prevent sticking) and the plate 40 set on it. The recess 47 and undercut 48 fasten the plate to this material.

The complete unit consists of the assembled sections 20 and 30, base 10 and cover plate 40, as indicated in Figure 1. The flask unit is pressed to remove excess material and taken with the cast contents and replica and placed in a vulcanizer and left there until the replica or dental plate is vulcanized or cured. After this the flask unit is taken out of the vulcanizer by the operator and the cover plate 40 removed. This is followed by the taking off of the upper section 30. This section when off the dowels is opened up on its hinges (see Fig. 5) until it exposes the casting material 50 of plaster or stone, or composition. Then the lower section is likewise lifted off and opened up. When the casting material is free of the sections, it is easily broken apart, because of the V-like grooves left in it. This leaves the replica bare after a little manipulation of the casting material and unharmed. This is accomplished without the use of a saw or other cutting tools, and very expeditiously. The opening up of the sections 20 and 30 is easily understood, as the hinges open up and leave the sectors A, B, C, AA, BB, and CC wide apart. They are self cleaning by reason of this operation. They also open up one after another so that each part of the casting material is exposed in sequence rather than in one operation. The material is therefore less liable to suffer from unnecessary damage.

While but one general form of the invention is shown in the drawings and described in the specifications, it is not desired to limit this application for patent to this particular form, as it is appreciated that other forms of construction could be made that would use the same principles and come within the scope of the appended claims.

Having thus described the invention, what is claimed is:

1. A flask or mold for dental purposes comprising two vertically superposed halves, each half consisting of a multipart frame, a plurality of jaws protruding from the longitudinal confines of one of said parts and lugs protruding from the longitudinal confines of each of two other adjoining parts, said lugs being received in said jaws when the cooperating parts of the frame are assembled, pin means carried by the lower of said halves at a plurality of points for securing the halves in vertical alignment, pin means carried by the upper of said halves at a plurality of points, a base plate and a cover plate for said flask or mold, said plates having openings therein to receive the pin means of both of said halves, said frame comprising three distinct parts and including hinges between two of the parts, whereby when said lugs are removed from said jaws, one of the aforesaid two parts pivots on the other of said two parts.

2. A flask or mold as set forth in claim 1, the internal walls of said halves having projections extending therefrom towards the material contained in the flask or mold.

LEO SCHARFE.

REFERENCES CITED

The following references are of record in the file of this patent:

UNITED STATES PATENTS

| Number | Name | Date |
| --- | --- | --- |
| 258,858 | Locke | May 30, 1882 |
| 1,595,525 | Sachs | Aug. 10, 1926 |
| 1,962,410 | Rodin | June 12, 1934 |
| 2,030,524 | Lambert | Feb. 11, 1936 |
| 2,491,046 | Hora | Dec. 13, 1949 |